(12) United States Patent
Mayer

(10) Patent No.: US 9,868,528 B2
(45) Date of Patent: Jan. 16, 2018

(54) DIVIDER ELEMENT FOR AN AIRCRAFT CABIN

(71) Applicant: Airbus Operations GmbH, Hamburg (DE)

(72) Inventor: Tobias Mayer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 144 days.

(21) Appl. No.: 14/677,424

(22) Filed: Apr. 2, 2015

(65) Prior Publication Data

US 2015/0284083 A1 Oct. 8, 2015

(30) Foreign Application Priority Data

Apr. 4, 2014 (EP) ..................................... 14163618

(51) Int. Cl.
*B64D 11/00* (2006.01)
*B64D 11/06* (2006.01)

(52) U.S. Cl.
CPC .......... *B64D 11/0023* (2013.01); *B64D 11/06* (2013.01); *Y02T 50/46* (2013.01)

(58) Field of Classification Search
CPC .... B64D 11/0023; B64D 11/0606; B64C 1/10
See application file for complete search history.

(56) References Cited

U.S. PATENT DOCUMENTS

| 3,423,121 | A | | 1/1969 | Lipkin | |
|---|---|---|---|---|---|
| 4,185,799 | A | | 1/1980 | Richards, Jr. | |
| 4,597,549 | A | | 7/1986 | Ryan | |
| 4,899,962 | A | * | 2/1990 | Mueller | B64D 11/0023 160/354 |
| 5,165,626 | A | | 11/1992 | Ringger | |
| 5,393,013 | A | * | 2/1995 | Schneider | B64D 11/0023 160/351 |

(Continued)

FOREIGN PATENT DOCUMENTS

| DE | 4014057 C1 | 10/1991 |
|---|---|---|
| DE | 10 2008 031 021 A1 | 1/2010 |

(Continued)

OTHER PUBLICATIONS

Extended European Search Report for Application No. 14163612.6 dated Oct. 9, 2014.

(Continued)

*Primary Examiner* — Richard R Green
(74) *Attorney, Agent, or Firm* — Jenkins, Wilson, Taylor & Hunt, P.A.

(57) ABSTRACT

A divider element for an aircraft cabin is disclosed including a frame member forming a closed ring wherein the frame member may assume an expanded state and a collapsed state, wherein in the expanded state the frame member extends in a plane and defines a first area which is surrounded by the frame member and wherein in the collapsed state the frame member defines a second area which is surrounded by the frame member, the second area being smaller than the first area, and a flexible sheet member which is fixed to the frame member and dimensioned such that when the frame member is in the expanded state, it extends over the area defined by the frame member.

10 Claims, 3 Drawing Sheets

(56) References Cited

U.S. PATENT DOCUMENTS

| | | | |
|---|---|---|---|
| 5,577,358 | A | 11/1996 | Franke |
| 5,816,534 | A | 10/1998 | Schumacher |
| 6,257,523 | B1 | 7/2001 | Olliges |
| 8,613,407 | B2 * | 12/2013 | Hartel ................ B64D 11/0023 160/351 |
| 8,869,865 | B2 | 10/2014 | Roach |
| 9,073,640 | B2 | 7/2015 | Mosler |
| 9,120,573 | B2 | 9/2015 | Ehlers |
| 9,227,728 | B2 | 1/2016 | Schimanowski |
| 2003/0127562 | A1 | 7/2003 | Pereira |
| 2009/0224103 | A1 | 9/2009 | Neumann |
| 2011/0114788 | A1 | 5/2011 | Mosler et al. |
| 2012/0043028 | A1 | 2/2012 | Roach |
| 2013/0082140 | A1 | 4/2013 | Ehlers |
| 2014/0217239 | A1 | 8/2014 | Ehlers et al. |
| 2015/0284082 | A1 | 10/2015 | Mayer et al. |
| 2015/0284084 | A1 | 10/2015 | Mayer |
| 2016/0115721 | A1 | 4/2016 | Leadens, II |

FOREIGN PATENT DOCUMENTS

| | | |
|---|---|---|
| DE | 10 2011 109 390 A1 | 2/2013 |
| EP | 0754621 A1 | 1/1997 |
| EP | 0850833 A2 | 7/1998 |
| EP | 0708018 B1 | 8/1998 |
| EP | 1118537 A2 | 7/2001 |
| EP | 1125520 A1 | 8/2001 |
| GB | 903956 A | 8/1962 |
| WO | WO-2010/084048 A1 | 7/2010 |

OTHER PUBLICATIONS

Extended European Search Report for Application No. 14163618 dated Sep. 17, 2014.

Extended European Search Report for Application No. 1416 3607.6 Nov. 14, 2014.

Non-Final Office Action for U.S. Appl. No. 14/677,414 dated Oct. 26, 2016.

Non-Final Office Action for U.S. Appl. No. 14/677,414 dated Dec. 7, 2016.

Notice of Allowance for U.S. Appl. No. 14/677,414 dated Apr. 18, 2017.

* cited by examiner

DIVIDER ELEMENT FOR AN AIRCRAFT CABIN

CROSS-REFERENCE TO RELATED APPLICATION

This application claims priority to European Patent Application No. 14163618.3 filed Apr. 4, 2014, the entire disclosure of which is incorporated by reference herein.

TECHNICAL FIELD

The present disclosure relates to a divider element for an aircraft cabin.

BACKGROUND

Aircraft cabin arrangements usually comprise a plurality of seat rows which are arranged perpendicularly to a longitudinal axis of the cabin and parallel one after another. Further, the cabin arrangement comprises different sections such as a business class and an economy class, and it is desirable to provide elements to visually separate the different sections from each other to prevent passengers from looking from one section to the other.

However, during take off and landing the cabin crew needs a free view through the entire cabin. Thus, elements which prevent such a view, need to be brought in a state so that they do not impede a view through the cabin.

Here, it is known to employ curtains on a guide rail as separation elements. However, curtain arrangements are rather complicated to handle and it is time consuming and cumbersome to shift the curtain from the expanded to the retracted position and to fix it in the latter.

Further, from EP 0 754 621 A1 a divider assembly is known comprising separate elements slidably supported in a guide rail extending perpendicularly to the longitudinal axis of the cabin along the ceiling portion.

SUMMARY

Thus, it is an object of the present disclosure to provide a divider arrangement which can easily be handled and changed between an expanded and a collapsed state.

This object is achieved by a divider element for an aircraft cabin comprising a frame member forming a closed ring wherein the frame member may assume an expanded state and a collapsed state, wherein in the expanded state the frame member extends in a plane and defines a first area which is surrounded by the frame member, and wherein in the collapsed state the frame member defines a second area which is surrounded by the frame member, the second area being smaller than the first area, and a flexible sheet member which is fixed to the frame member and dimensioned such that when the frame member is in the expanded state, it extends over the area defined by the frame member.

The divider element according to the present disclosure can be changed from its expanded state in which it is effective as a screening element, to a collapsed state in which it does not impede the view of the cabin crew through the entire cabin by simply deforming the shape of the frame member so that the area enclosed by the frame member is reduced. This facilitates the handling of the divider element to a large extent compared to curtains or the like.

Further, when the frame member is formed of a resilient material rather than being rigid, a load applied by a passenger to an end of the frame member remote from the support such as a connection to a ceiling element, e.g. a hatrack, cannot exceed critical thresholds. In particular, due to the elasticity of the frame member, it is not possible that a load corresponding to the entire weight of a passenger is transferred to the support. Rather than taking up the complete load of a passenger's weight, the frame member will deform and follow the force applied to it, whereas a rigid element such as guide rail for a curtain would not deform so that when a passenger grasps for such a rail, the load generated by his weight would completely be transferred to the support of the guide rail.

In order to minimize the area the divider has when being in the collapsed state, so as to form the smallest obstruction, it is preferred that the frame member in the collapsed state has a linear shape such that any portion of the closed ring abuts on a further portion of the closed ring. Thus, the area enclosed by the frame member shrinks to a line having the shape of the frame member. In this regard, it should be noted that the linear shape in this sense does not necessarily mean that the frame member extends along a straight line and is rectilinear, respectively, but it is also possible that the shape is curved. Instead, it only essential that in the collapsed state along the entire frame member there is no gap between opposing portions of the frame member.

In a further preferred embodiment the frame member comprises an upper section having first and second ends, a lower section having first and second ends, a first lateral section and a second lateral section. The first lateral section connects the first end of the upper section with the first end of the lower section, whereas the second lateral section connects the second end of the upper section with the second end of the lower section, so that in the expanded state a parallelogram is formed. In this preferred embodiment there are pivotable connections between the first end of the upper section and the first lateral section, between the first end of the lower section and the first lateral section, and between the second end of the lower section and the second lateral section, whereas the connection between the second end of the upper section and the second lateral section defines a fixed angle. Finally, the lower section comprises a hinge portion at a distance from its second end.

In this preferred embodiment in the expanded state the frame member is parallelogram-shaped, whereas it comprises a linear but angled shape when being in the collapsed state. This allows to laterally arrange the divider element in a cabin below the hatrack wherein the second lateral section is arranged in parallel to the lateral wall section of the cabin and due to the fixed angle between this second lateral section and the upper section remains in this position regardless whether the frame member is in the expanded or collapsed state. Further, in the expanded state, the lower section is rectilinear so that it can be positioned above the head rest portions of the seats in the cabin, whereas in the collapsed state the portion of the lower section between the second end at which it is connected with the second lateral section, and the hinge portion runs in parallel to the second lateral portion and the remaining portion of the lower section and the first lateral section run parallel and adjacent to the upper section. Thus, in the collapsed state the lower section is angled and the divider element fits well into a common cabin design.

In order to minimize in the collapsed state the area or cross section of this preferred form of a divider element, the distance between the second end of the lower section and the hinge portion corresponds to the length of the second lateral section. Then, it is achieved that in the collapsed state the hinge portion is directly opposite the connection between the second end of the upper section and the second lateral section.

Furthermore, it is preferred that the frame member is integrally formed, wherein the connections between the first end of the upper section and the first lateral member, the connection between the first end of the lower member the first lateral member, the connection between the second end of the lower member and the second lateral member and the hinge portion comprise a knuckle line. Such a frame member can easily and cost-effectively be produced. In particular, the frame member can be formed of tape material, preferably metal band material, wherein the tape material perpendicular to the plane defined by the frame member is provided with a non-rectilinear cross section. Such a structure provides for the required stability of the frame member between the connections but does not create a large amount of extra weight.

Moreover, in a further preferred embodiment, magnet elements are provided which are positioned on the frame member in such a manner that, when the frame member is in the collapsed state, an attracting force between opposite portions of the frame member is occurring so that the frame member is maintained in the collapsed state. Such an arrangement stabilizes the divider element when being in the collapsed state but it is still possible, to easily switch between the different states.

In another preferred embodiment the frame member is formed of shape memory material having a permanent form which corresponds to one of the expanded and the collapsed states, whereas a temporary form corresponds the other of the expanded and the collapsed state. Further, the divider element is adapted to provide a stimulus such that a transition from the other of the expanded and the collapsed state to the one of the expanded and the collapsed state is induced. Thus, in this preferred embodiment, a transition from the expanded state of the frame member to the collapsed state or vice versa can be induced by the stimulus such as heat or an electric pulse. This triggers that the shape-memory material returns to its permanent form. Thus, if the collapsed state of the frame corresponds to the permanent form, the transition from the expanded state to the collapsed state can remotely be obtained by actuating corresponding operating structure which activates the stimulus. The transition in the opposite direction back to the expanded state would have to be carried out manually by the cabin crew.

Finally, the divider element as described before can be employed in an aircraft cabin arrangement comprising a floor, a plurality of rows of seats arranged in parallel one after another, the rows extending transversely to a longitudinal axis of the cabin arrangement, and a ceiling assembly, wherein the divider element is mounted on the ceiling assembly in such a manner that the plane in which the frame member extends in the expanded state, is parallel to the rows of seats.

BRIEF DESCRIPTION OF THE DRAWINGS

In the following, a preferred embodiment of an aircraft cabin divider element of the present disclosure is described in detail by a drawing. The drawing shows in FIG. 1 a plane view of a preferred embodiment of an aircraft cabin divider according to the present disclosure in the expanded state, FIG. 2 a plane view of the divider of FIG. 1 in an intermediate state, FIG. 3 a plane view of the divider of FIG. 1 in the collapsed state, FIG. 4 a first perspective view of the divider of FIG. 1 in the expanded state, and FIG. 5 a second perspective view of the divider of FIG. 1 in the collapsed state.

DETAILED DESCRIPTION

Figure 1:
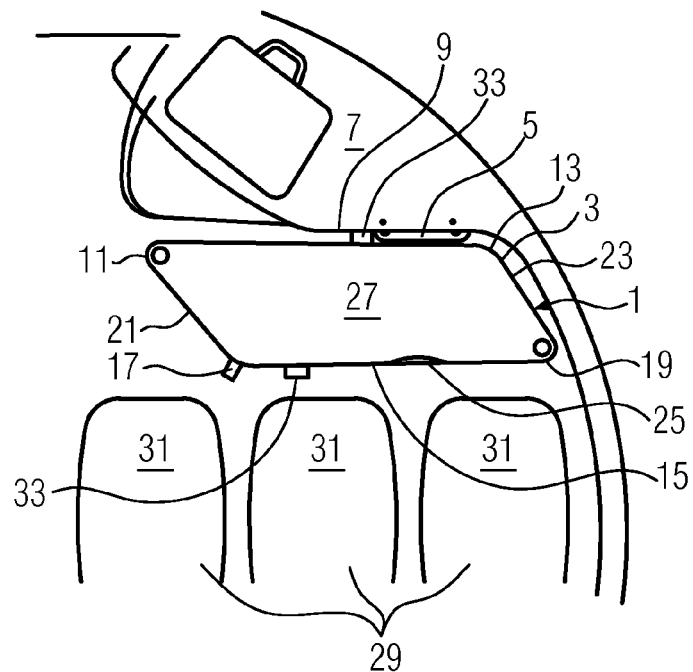

The preferred embodiment of an aircraft cabin divider element 1 shown in the drawings comprises frame member 3 which is provided with coupling elements 5 so that the divider element 1 can be connected to a ceiling element of the cabin arrangement in the form of a hatrack 7.

The frame member 3 of the preferred embodiment is formed as a closed ring of a tape material in the form of a metal band and the cross section perpendicular to the extension direction of metal band, i.e. perpendicular to the plane defined by the frame member 3, is non-rectilinear such that it has a curved or bended shape. Thus, the sections of the frame member 3 have a predetermined stability in directions transverse to the extension direction but can elastically be deformed by high loads.

The frame member 3 comprises an upper section 9 which has a first end 11 and a second end 13 and which extends rectilinear between these ends 11, 13. Further, the frame member 3 comprises a lower section 15 having a first end 17 and a second end 19 and which is rectilinear shaped between the ends 17, 19 as well. In addition, the frame member 3 is provided with a first lateral section 21 and a second lateral section 23, the first lateral section 21 connecting the first end 11 of the upper section 9 with the first end 21 of the lower section 15. Further, the second lateral section 23 connects the second end 13 of the upper section 9 with the second end 19 of the lower section 15 and extends essentially parallel to a lateral wall of the cabin arrangement.

Thus, when the frame member 3 is in the expanded state as shown in FIG. 1, it has the shape of a parallelogram and defines an area which is completely enclosed by the frame member 3.

Figure 2:
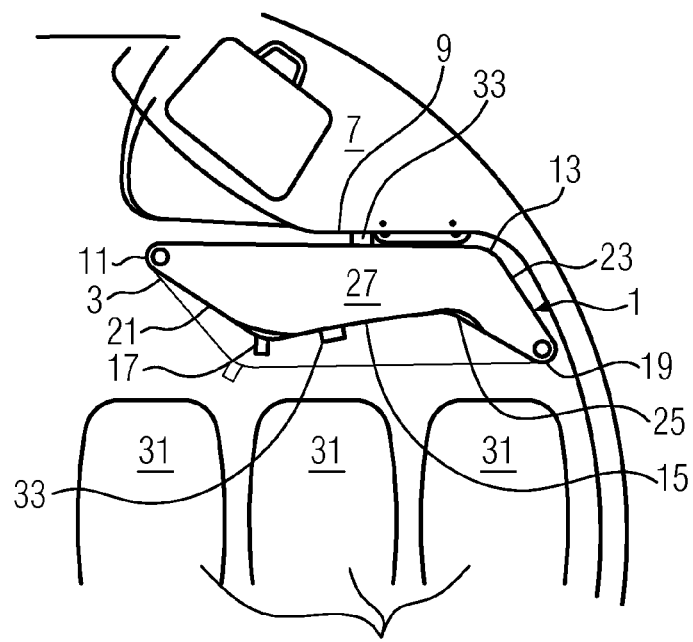
Figure 3:
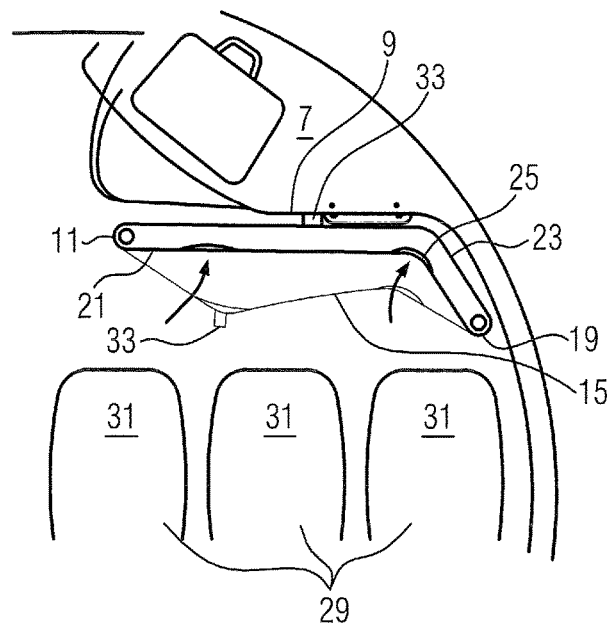
Figure 4:
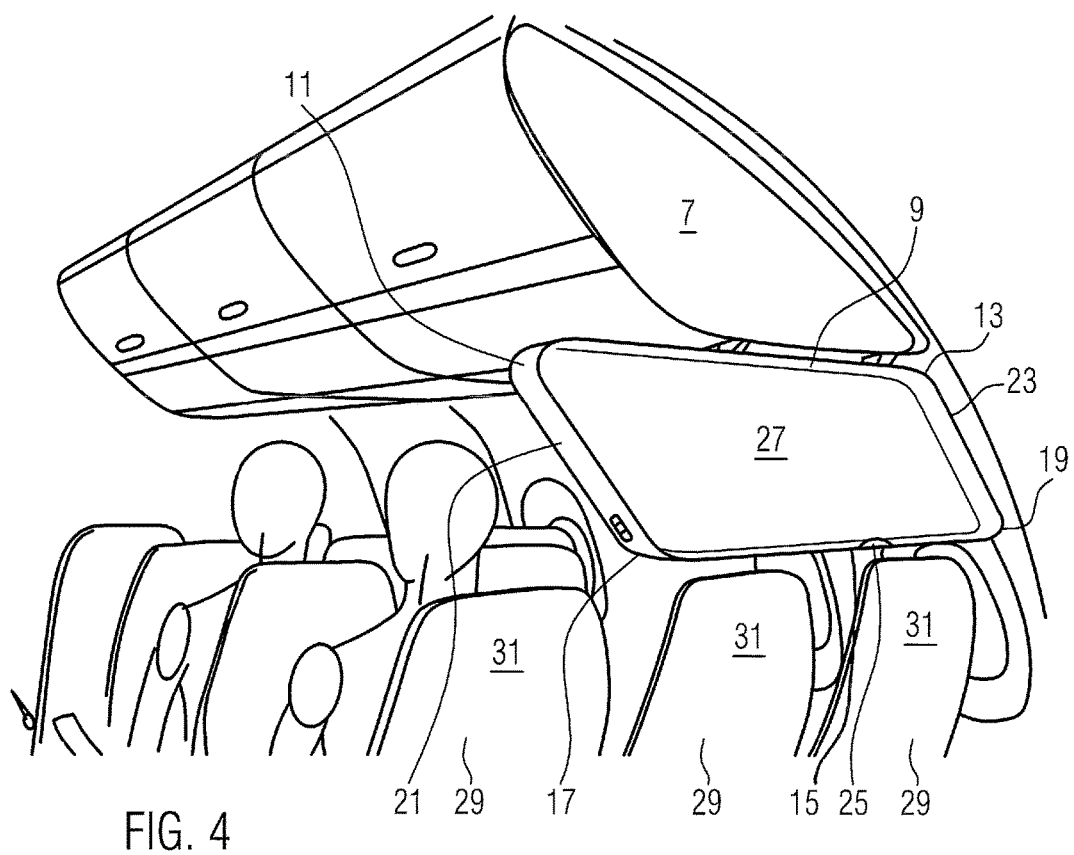

Moreover, as can be seen in FIGS. 2 and 3, there are pivotable connections between the first end 11 of the upper section 9 and the first lateral section 21, between the first end 17 of the lower section 15 and the first lateral section 21, and between the second end 19 of the lower section 15 and the second lateral section 23. In this preferred embodiment, in which the frame member 3 is formed of a metal band, these pivotable connections are formed as knuckle lines extending perpendicularly with respect to the extension direction of the adjacent frame sections 9, 15, 21, 23.

However, the connection between the second end 13 of the upper section 9 and the second lateral section 23 defines a fixed angle so that a pivoting movement of the second lateral section 23 relative to the upper section 9 is prevented.

Finally, the lower section 15 comprises a hinge portion 25 which is arranged at a distance from the second end 19 of the lower section 15, and this distance corresponds in this preferred embodiment to the length of the second lateral section 23. Further, the hinge portion 25 is also formed as a knuckle line extending perpendicularly to the extension direction of the lower section 15 and the hinge portion 25 is adapted such that only a pivoting movement of the portions of the lower section 15 adjacent to the hinge portion 25 towards the upper section 9 is possible, whereas a pivoting movement away from the upper section 9 is prevented.

A flexible sheet member 27 is fixed to the sections 9, 15, 21, 23 of the frame member 3 and dimensioned such that when the frame member 3 is in the expanded state, it extends over the area defined and enclosed by the frame member 3. This sheet member 27 is formed of a flexible opaque material so that it is effective as a screening element. In addition symbols or the like may be printed on the sheet element 27 or it may be provided with lighting elements. Further, the sheet material may also have such surface properties that it can be used as a projection screen.

The entire divider 1 is arranged in the cabin in such a manner that in the expanded state the lower section 15 extends parallel to a row of seats 29, which row is arranged generally transversely and in this case perpendicularly to a longitudinal axis of the cabin, the lower section 15 being above the headrests 31 of the seats 27. Thus, the divider element 1 is mounted on the ceiling assembly in such a manner that the plane in which the frame member extends in the expanded state, is parallel to the rows of seats 29.

When the frame member 3 is in the expanded state as shown in FIG. 1, the opaque sheet member 27 is effective as screening element so that a view through the cabin from one side of the divider to the other is impeded. However, when the first lateral element 21 is pivoted around the pivotable connection between the first end 11 of the upper section 9 towards the upper section 9, the portions of the lower section 15 adjacent to the hinge portion 25 will both pivot towards the upper section 9 as well (see FIG. 2).

Figure 5:
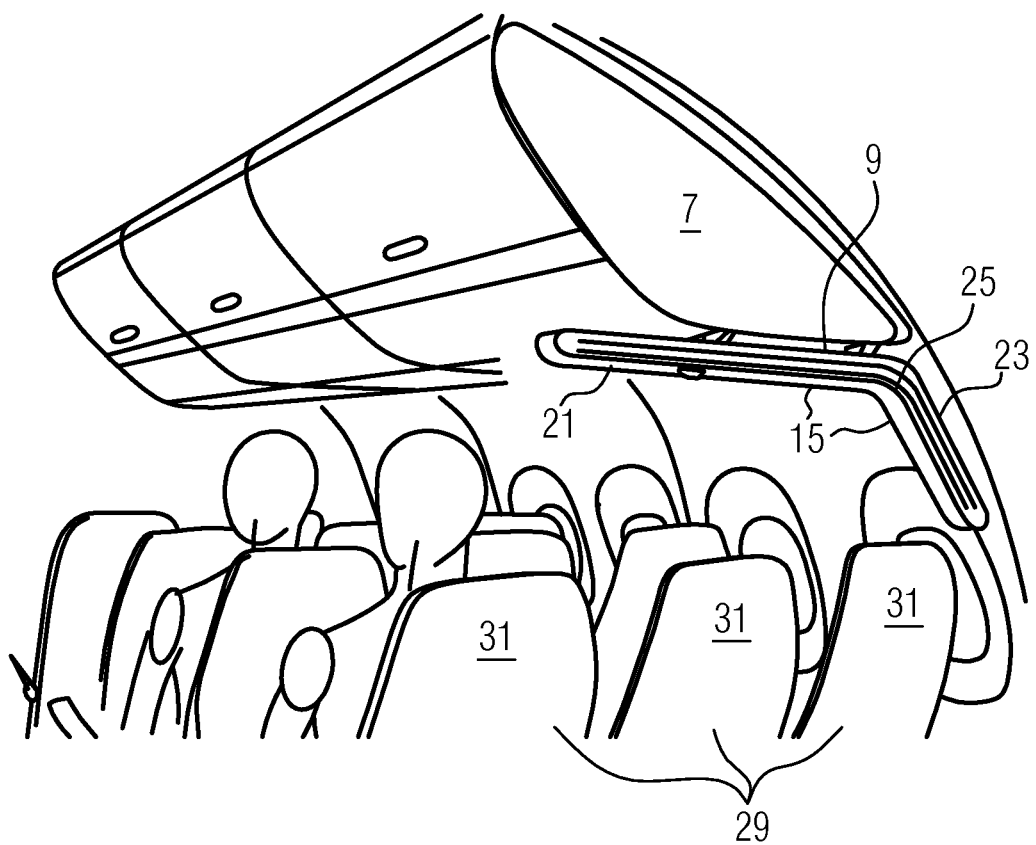

Finally, when the first lateral section 21 is completely pivoted towards the upper section 9 so that the upper section 9 and the first lateral section 21 are parallel to and abut on each other, that portion of the lower section 15 between the hinge portion 25 and the second end 19 abuts on the second lateral section 23, whereas the other portion of the lower section 15 between the hinge portion 25 and the first end 17 abuts on the upper section 9 (see FIGS. 3 and 5). Then the divider element 1 has been transformed to the collapsed state, and it does no longer impede the view through the cabin.

In this preferred embodiment, the lower section 15 and the upper section 9 are provided with magnet elements 33 which are adapted such that an attracting force occurs between these elements 33, and in the collapsed state of the frame member 3 the magnet elements 33 are positioned opposite to each other so that the frame member 3 is kept in the collapsed state by the attracting force between the magnet elements 33.

Furthermore, the frame member 3 and the band material, respectively, can comprise a shape memory material having a permanent form which corresponds the collapsed state (FIGS. 3 and 5), whereas a temporary form corresponds the other of the expanded state (FIGS. 1 and 3). In addition, the divider element 1 can be adapted to provide a stimulus such that a transition from the expanded state to the collapsed state is induced, so that the transition from the expanded state of the frame member 3 to the collapsed state can be induced by the stimulus such as heat or an electric pulse. This triggers that the shape-memory material returns to its permanent form and the transition from the expanded state to the collapsed state can remotely be obtained by actuating corresponding operating structure for example in the form of a switch which activates the stimulus. However, the transition in the opposite direction back to the expanded state would have to be carried out manually by the cabin crew.

In the collapsed state, the area which is enclosed by the frame member 3 and in which the sheet member 27 extends, is minimized and each portion or section 9, 15, 21, 23 is positioned directly opposite to another section or portion and abuts on it. Thus, in the collapsed state, the frame member 3 assumes a linear but bended shape as the second lateral section 23 is parallel to the lateral wall whereas the upper section 9 is arranged horizontally.

Moreover, the frame member 3 is elastic rather than rigid, so that it can be deformed when a passenger grasps it. This has the effect that it is almost impossible that a load corresponding to the entire weight of a passenger is transferred to the hatrack 7 via the coupling element 5. Therefore, the requirements as to stability of the connection between the hatrack 7 and coupling elements 5 are not as high as in the case where the divider is formed of rigid material. This, in turn leads to weight savings compared to divider arrangements employing curtains.

In conclusion, the present disclosure provides for a light divider element 1 which is easy to handle for the cabin crew.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A divider element for an aircraft cabin, comprising:
a frame member forming a closed ring wherein the frame member may assume an expanded state and a collapsed state;
wherein in the expanded state the frame member extends in a plane and defines a first area which is surrounded by the frame member; and
wherein in the collapsed state the frame member defines a second area which is surrounded by the frame member, the second area being smaller than the first area; and
a flexible sheet member which is fixed to the frame member and dimensioned such that when the frame member is in the expanded state, it extends over the area defined by the frame member,
wherein the frame member comprises an upper section having first and second ends, a lower section having first and second ends, a first lateral section and a second lateral section;
wherein the first lateral section connects the first end of the upper section with the first end of the lower section;
wherein the second lateral section connects the second end of the upper section with the second end of the lower section;
wherein there is a pivotable connection between the first end of the upper section and the first lateral section;
wherein there is a pivotable connection between the first end of the lower section and the first lateral section;
wherein the connection between the second end of the upper section and the second lateral section defines a fixed angle;
wherein there is a pivotable connection between the second end of the lower section and the second lateral section; and wherein the lower section comprises a hinge portion at a distance from its second end.

2. The divider element according to claim 1, wherein in the collapsed state the frame member has a linear shape such that any portion of the closed ring abuts on a further portion of the closed ring.

3. The divider element according to claim 1, wherein the distance between the second end of the lower section and the hinge portion corresponds to a length of the second lateral section.

4. The divider element according to claim 1, wherein the frame member is integrally formed, and
wherein the connections between the first end of the upper section and the first lateral member, the connection between the first end of the lower section and the first lateral member, the connection between the second end of the lower section and the second lateral member and the hinge portion comprise a knuckle line.

5. The divider element according to claim 4, wherein the frame member is formed of tape material, and
wherein the tape material perpendicular to the plane defined by the frame member is provided with a non-rectilinear cross section.

6. The divider element according to claim 5, wherein the frame member is formed of tape material that is a metal band material.

7. The divider element according to claim 1, wherein magnet elements are provided which are positioned on the frame member in such a manner that, when the frame member is in the collapsed state, an attracting force between opposite portions of the frame member is occurring so that the frame member is maintained in the collapsed state.

8. The divider element according to claim 1, wherein the frame member is formed of shape memory material having a permanent form which corresponds to one of the expanded and the collapsed states, whereas a temporary form corresponds the other of the expanded and the collapsed states, and
wherein the divider is adapted to provide a stimulus such that a transition from the other of the expanded and the collapsed states to the one of the expanded and the collapsed states is induced.

9. An aircraft cabin arrangement comprising
a floor,
a plurality of rows of seats arranged in parallel one after another, the rows extending transversely to a longitudinal axis of the cabin arrangement;
a ceiling assembly; and
a divider element according to claim 1, which is mounted on the ceiling assembly such that the plane in which the frame member extends in the expanded state, is parallel to the rows of seats.

10. A divider element for an aircraft cabin, comprising:
a frame member forming a closed ring wherein the frame member may assume an expanded state and a collapsed state;
wherein in the expanded state the frame member extends in a plane and defines a first area which is surrounded by the frame member; and
wherein in the collapsed state the frame member defines a second area which is surrounded by the frame member, the second area being smaller than the first area; and
a flexible sheet member which is fixed to the frame member and dimensioned such that when the frame member is in the expanded state, it extends over the area defined by the frame member,
wherein the frame member is formed of shape memory material having a permanent form which corresponds to one of the expanded and the collapsed states, whereas a temporary form corresponds the other of the expanded and the collapsed states, and
wherein the divider is adapted to provide a stimulus such that a transition from the other of the expanded and the collapsed states to the one of the expanded and the collapsed states is induced.

* * * * *